(12) United States Patent
Chida et al.

(10) Patent No.: US 9,679,149 B2
(45) Date of Patent: Jun. 13, 2017

(54) SECRET SHARING SYSTEM, DATA DISTRIBUTION APPARATUS, DISTRIBUTED DATA TRANSFORM APPARATUS, SECRET SHARING METHOD AND PROGRAM

(71) Applicant: NIPPON TELEGRAPH AND TELEPHONE CORPORATION, Tokyo (JP)

(72) Inventors: Koji Chida, Tokyo (JP); Dai Ikarashi, Tokyo (JP); Koki Hamada, Tokyo (JP); Ryo Kikuchi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 63 days.

(21) Appl. No.: 14/408,453

(22) PCT Filed: Jul. 4, 2013

(86) PCT No.: PCT/JP2013/068330
§ 371 (c)(1),
(2) Date: Dec. 16, 2014

(87) PCT Pub. No.: WO2014/007311
PCT Pub. Date: Jan. 9, 2014

(65) Prior Publication Data
US 2015/0193633 A1 Jul. 9, 2015

(30) Foreign Application Priority Data

Jul. 5, 2012 (JP) ................... 2012-151139

(51) Int. Cl.
*G06F 21/62* (2013.01)
*G06F 21/60* (2013.01)
(Continued)

(52) U.S. Cl.
CPC ............. *G06F 21/62* (2013.01); *G06F 21/60* (2013.01); *G06F 21/606* (2013.01); *H04L 9/008* (2013.01); *H04L 9/085* (2013.01); *H04L 2209/46* (2013.01)

(58) Field of Classification Search
CPC ......... H04L 9/085; H04L 9/008; G06F 21/60; G06F 21/62
See application file for complete search history.

(56) References Cited

U.S. PATENT DOCUMENTS

| 8,675,877 B2* | 3/2014 | Schneider | ............... H04L 9/085 380/255 |
| 2010/0008505 A1* | 1/2010 | Bai | .......... H04L 9/085 380/255 |

(Continued)

FOREIGN PATENT DOCUMENTS

| JP | 2004 287333 | 10/2004 |
| JP | 2007 124610 | 5/2007 |

OTHER PUBLICATIONS

Cramer et al., "Share conversion, psuedorandom secret-sharing and applications to secure distributed computing", 2005, 21 pages.*

(Continued)

*Primary Examiner* — Shawnchoy Rahman
*Assistant Examiner* — Thaddeus Plecha
(74) *Attorney, Agent, or Firm* — Oblon, McClelland, Maier & Neustadt, L.L.P.

(57) ABSTRACT

A secret sharing system transforms shares in ramp secret sharing to shares in homomorphic secret sharing. On a data distribution apparatus, a division part divides information a into N shares $f_a(n)$ using an arbitrary ramp secret sharing scheme S1. On each of distributed data transform apparatuses, a random number selecting part generates a random number vector $r_i$ whose elements are L random numbers $r_{i1}$. A first random number division part divides the random number vector into N shares $f_{r_i}(n)$ using a ramp secret sharing scheme S1. A second random number division part divides each of the L random numbers $r_{i1}$ into N shares $g_{r_{i,1}}(n)$ using an arbitrary secret sharing scheme S2. A disturbance part generates a share $U_i$ by using a share $f_a(i)$ (Continued)

and shares $f_{r\lambda}(i)$. A reconstruction part reconstructs L pieces of disturbance information $c_1$ from shares $U_\lambda$ by using the ramp secret sharing scheme S1. A redivision part divides each piece of disturbance information $c_1$ into N using the secret sharing scheme S2 to generate shares $g_{c1}(n)$. A transform part generates shares $g_{a1}(i)$ of the information a by using a share $g_{c1}(i)$ and the shares $g_{r\lambda,1}(i)$.

6 Claims, 5 Drawing Sheets

(51) Int. Cl.
*H04L 9/00* (2006.01)
*H04L 9/08* (2006.01)

(56) References Cited

U.S. PATENT DOCUMENTS

| | | | | |
|---|---|---|---|---|
| 2014/0019774 A1* | 1/2014 | Nakayama | ............... | G06F 21/79 713/189 |
| 2014/0173270 A1* | 6/2014 | Matsuo | ................. | H04L 9/0869 713/150 |
| 2015/0172049 A1* | 6/2015 | Chida | ................... | G06F 21/606 380/46 |

OTHER PUBLICATIONS

Bai, "A Strong Ramp Secret Sharing Scheme Using Matrix Projection", 2006, 5 pages.*
Chen et al., "Algebraic Geometric Secret Sharing Schemes and Secure Multi-Party Computations over Small Fields", 2006, pp. 521-536.*
Beimel, "Secret-Sharing Schemes: A Survey", 2011, 36 pages.*
Capocelli et al., "On the Size of Shares for Secret Sharing Schemes", Journal of Cryptography, 1993, pp. 157-167.*
Ronald Cramer, et al., "Atomic Secure Multi-party Multiplication with Low Communication", Lecture Notes in Computer Science, vol. 4515, pp. 329-346, (2007).
Koji Chida, et al., "A Short Computational Secret Sharing Scheme Applicable to a Multiparty Computation", The Institute of Electronics, Information and Communication Engineers, SCIS 2012, Total 14 Pages, (2012) (with partial English translation).
Koji Chida, et al., "Efficient Conversions from Computational SSS and Ramp SSS to Multi-Party Computation", IEICE Technology Report, vol. 112, No. 126, Total 11 Pages, (Jul. 12, 2012) (with English Abstract).
Adi Shamir, "How to Share a Secret", Communications of the ACM, vol. 22, No. 11, pp. 612-613, (1979).
Hirosuke Yamamoto, "Secret Sharing Scheme and Its Variations", Research Institute for Mathematical Sciences Kokyuroku, vol. 1361, pp. 19-31, (2004) (with partial English translation).
Michael Ben-Or, et al., "Completeness Theorems for Non-Cryptographic Fault-Tolerant Distributed Computation (extended abstract)", STOC 1988, pp. 1-10, (1988).
Ronald Cramer, et al., "General Secure Multi-party Computation from any Linear Secret-Sharing Scheme", EUROCRYPTO 2000, pp. 316-334, (2000).
International Search Report Issued Aug. 6, 2013 in PCT/JP13/068330 Filed Jul. 4, 2013.

* cited by examiner

SECRET SHARING SYSTEM, DATA DISTRIBUTION APPARATUS, DISTRIBUTED DATA TRANSFORM APPARATUS, SECRET SHARING METHOD AND PROGRAM

TECHNICAL FIELD

The present invention relates to a ramp secret sharing technique and a multiparty computation technique.

BACKGROUND ART

Secret sharing is a technique by which data is transformed into multiple shares so that the original data can be reconstructed by using a certain number of shares or more but none of the original data can be reconstructed by using any number of shares less than the certain number. Some secret sharing schemes impose restrictions on the total number N of shares and the smallest number K(≤N) of shares required for reconstruction and others not.

A typical secret sharing scheme is Shamir's secret sharing scheme (see Non-patent literature 1, for example). In an example of this scheme, shares $S_i(a)=f(i)$ (i=1, ..., N) of a is obtained from a K−1-degree expression f(x), where x is a variable, such that f(0)=a for a∈GF(p), where p is a prime, and GF(p) is a finite field of order p. Here, a can be reconstructed from any K different shares because the following relationship holds:

$$a = f(0) = \sum_{i=1}^{K} f(n_i) \cdot L_i(0) \quad \text{[Formula 1]}$$

$$L_i(x) = \prod_{j \neq i, j=1}^{K} \frac{x - n_j}{n_i - n_j}$$

where $n_1, \ldots, n_K$ are different integers greater than or equal to 1 and less than or equal to N.

Another type of secret sharing is ramp secret sharing schemes, in which no part of original data can be reconstructed from K−L or less shares, where L is an integer less than K (see Non-patent literature 2, for example). In an example of the schemes, shares $T_i(a)=f(i)$ (i=1, ..., N) of information $a=(a_0, a_1, \ldots, a_{L-1})$ ($a_0, a_1, \ldots, a_{L-1} \in GF(p)$) are obtained from a K−1-degree expression $f(x)=a_0+a_1x+\ldots+a_{L-1}x^{L-1}+r_Lx^L+\ldots+r_{K-1}x^{K-1}$, where x is a variable, determined from the information a and random numbers $r_L, \ldots, r_{K-1} \in GF(p)$. Then the coefficients $a_0, a_1, \ldots, a_{L-1}$ of the expression f(x) can be uniquely obtained from K points $(n_i, f(n_i))$ (i=1, K), where $n_1, \ldots, n_K$ are different integers greater than or equal to 1 and less than or equal to N. This can be accomplished simply by finding the solutions for $a_0, a_1, \ldots, a_{L-1}$ in the following matrix, where $a_0, a_1, \ldots, a_{L-1}, r_L, \ldots, r_{K-1}$ are variables.

$$\begin{pmatrix} f(n_1) \\ \vdots \\ f(n_K) \end{pmatrix} = \begin{pmatrix} n_1^0 & \cdots & N_1^{K-1} \\ \vdots & \ddots & \vdots \\ n_K^0 & \cdots & N_K^{K-1} \end{pmatrix} \begin{pmatrix} a_0 \\ \vdots \\ a_{L-1} \\ r_L \\ \vdots \\ r_{K-1} \end{pmatrix} \quad \text{[Formula 2]}$$

On the other hand, a multiparty computation scheme, which uses secret sharing as an elemental technology, has been proposed. The multiparty computation is a technique in which each computing entity i (i=1, ..., N) takes an input of information $a_i$ and obtains a particular function value $F_i(a_1, \ldots, a_N)$ without revealing the information $a_i$ to the other computing entities. In Shamir's secret sharing scheme described above, shares $S_i(a+b)$ of a+b and shares $S_i(ab)$ of ab can be obtained from shares $S_i(a), S_i(b)$ of information a, b∈GF(p) without revealing inputs into the computing entities (see Non-patent literature 3). That is, multiparty computations of addition and multiplication are possible using Shamir's secret sharing scheme. Note that secret sharing that satisfies the relationship $S_i(a)+S_i(b)=s_i(a+b)$ is called additive homomorphic secret sharing.

Another type of secret sharing is linear secret sharing schemes. The linear secret schemes can be defined as secret sharing in which all of the shares of original data a∈GF(p) can be represented by a∈GF(p) and a linear combination of random numbers on GF(p). It is known that any linear secret sharing scheme can be extended to multiparty computation (see Non-patent literature 4).

PRIOR ART LITERATURE

Non-Patent Literature

Non-patent literature 1: A. Shamir, "How to share a secret", Commun. ACM 22 (11), pp. 612-613, 1979.
Non-patent literature 2: Hirosuke Yamamoto, "Secret sharing and its variations", Research Institute for Mathematical Sciences, Kokyuroku Vol. 1361, pp. 19-31, 2004
Non-patent literature 3: M. Ben-Or, S. Goldwasser, and A. Wigderson, "Completeness theorems for non-cryptographic fault-tolerant distributed computation (extended abstract)", STOC 1988, pp. 1-10, 1988.
Non-patent literature 4: R. Cramer, I. Damgard and U. Maurer, "General Secure Multi-Party Computation from any Linear Secret-Sharing Scheme", Eurocrypto 2000, pp. 316-334, 2000.

SUMMARY OF THE INVENTION

Problem to be Solved by the Invention

In Shamir's secret sharing scheme, the total data amount of shares is approximately N times the data amount of each piece of information a, given that the data amount of information a and the data amount of each share of the information a are constant. The total data amount of shares required for reconstructing each piece of information a is approximately K times the data amount of the piece of information a. It is desirable to minimize the data amount of shares because an increase in the data amount of shares leads to increases in communication time and the amount of stored data.

In the ramp secret sharing schemes, $T_i(a)+T_i(b)=T_i(a+b)$, where $a+b=(a_0+b_0, a_1+b_1, \ldots, a_{L-1}+b_{L-1})$, and thus multiparty additions is possible. However, methods for multiparty multiplications may not be self-evident in the ramp secret sharing schemes because usually $T_i(a)T_i(b)$ cannot be shares of $ab=(a_0b_0, a_1b_1, \ldots, a_{L-1}b_{L-1})$.

The present invention has been made in light of these circumstances and an object of the present invention is to provide a secret sharing technique capable of using shares according to a ramp secret sharing scheme to perform multiparty computation.

Means to Solve the Problems

To solve the problem, a secret sharing system of the present invention includes a data distribution apparatus and N distributed data transform apparatuses. In the present invention, N, K and L are integers greater than or equal to 2. N≥K>L, n=1, ..., N, λ represents K different integers greater than or equal to 1 and less than or equal to N, i is an integer, i∈λ, $f_x(n)$ is N shares of x, R is a ring.

The data distribution apparatus includes a division part. The division part divides information $a=(a_1, \ldots, a_L) \in R^L$ into N shares $f_a(n)$ by using an arbitrary homomorphic ramp secret sharing scheme S1.

Each of the distributed data transform apparatuses includes a random number selecting part, a first random number division part, a second random number division part, a disturbance part, a reconstruction part, a redivision part, and a transform part. The random number selecting part generates a random number vector $r_i=(r_{i,1}, \ldots, r_{i,L})$ whose elements are L random numbers $r_{i,1}, \ldots, r_{i,L} \in R$. The first random number division part divides the random number vector $r_i$ into N shares fan) by using an arbitrary homomorphic ramp secret sharing scheme S1. The second random number division part divides each of the random numbers $r_{i,1}, \ldots, r_{i,L}$ into N shares $g_{i,1}(n), \ldots, g_{i,L}(n)$ by using an arbitrary homomorphic secret sharing scheme S2. The disturbance part generates a share $U_i$ by using a share $f_a(i)$ included in the shares $f_a(n)$ and K shares $f_{r\lambda}(i)$. The reconstruction part reconstructs L pieces of disturbance information $c_i, \ldots, c_L$ from K shares $U_\lambda$ by using an arbitrary homomorphic ramp secret sharing scheme S1. The redivision part divides each piece of the disturbance information $c_1, \ldots, c_L$ into N by using an arbitrary homomorphic secret sharing scheme S2 to generate shares $g_{c1}(n), \ldots, g_{cL}(n)$. The transform part generates shares $g_{a1}(i), \ldots, g_{aL}(i)$ of the information a by using L shares $g_{c1}(i), \ldots, g_{cL}(i)$ included in the shares $g_{c1}(n), \ldots, g_{cL}(n)$ and L×K shares $g_{r\lambda,1}(i), \ldots, g_{r\lambda,L}(i)$.

Effects of the Invention

According to the secret sharing technique of the present invention, shares generated by an arbitrary homomorphic ramp secret sharing scheme can be transformed into shares in an arbitrary homomorphic secret sharing scheme. For example, many of the existing linear secret sharing schemes such as Shamir's secret sharing scheme are homomorphic secret sharing schemes, and therefore multiparty computation methods using shares according to existing linear secret sharing schemes such as Shamir's secret sharing scheme are known. Therefore, choosing an existing linear secret sharing such as Shamir's secret sharing scheme as a homomorphic secret sharing scheme enables multiparty computation using shares according to a ramp secret sharing scheme. Additionally, since ramp secret sharing schemes are efficient in encoding and the size of shares is small, the total data amount of shares to store and the total data amount of shares required for reconstruction can be reduced.

DETAILED DESCRIPTION OF THE EMBODIMENTS

Figure 1:
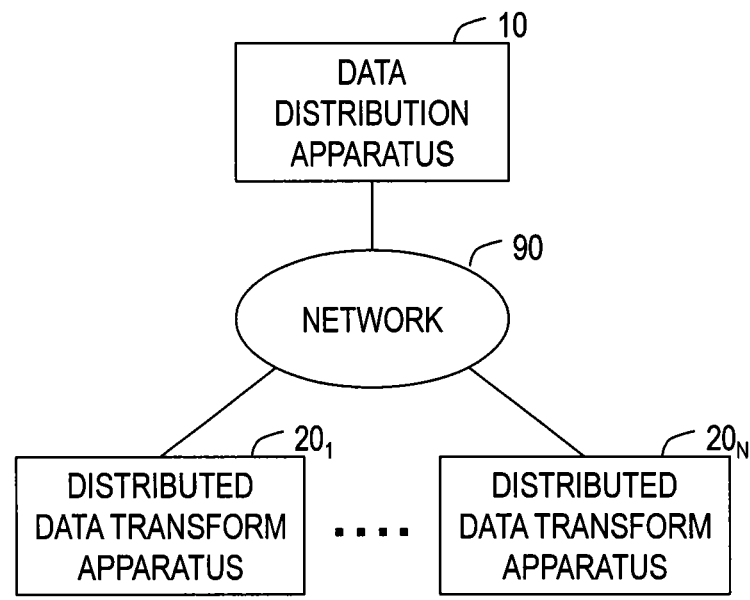
FIG. 1 is a diagram illustrating a functional configuration of a secret sharing system.

Embodiments of the present invention will be described below in detail. Components having like functions are given like reference numerals throughout the drawings and repeated description of those components will be omitted.

[Embodiment]

A secret sharing system according to an embodiment of the present invention transforms shares according to an arbitrary homomorphic ramp secret sharing scheme into shares according to an arbitrary homomorphic secret sharing scheme.

<Configuration>

Referring to FIG. 1, an exemplary configuration of a secret sharing system 1 according to the embodiment will be described. The secret sharing system 1 includes a data distribution apparatus 10, at least N distributed data transform apparatuses $20_1$-$20_N$, and a network 90. The data distribution apparatus 10 and the distributed data transform apparatuses $20_1$-$20_N$ are connected to the network 90. The network 90 only needs to be configured to allow the data distribution apparatus 10 and the distributed data transform apparatuses $20_1$-$20_N$ to communicate with each other and may be, for example, the Internet, a LAN, a WAN or the like. The data distribution apparatus 10 and the distributed data transform apparatuses 201-20N are not necessarily able to communicate online through a network. For example, information output from the data distribution apparatus 10 may be stored on a portable recording medium such as a USB memory and may be input offline from the portable recording medium into the distributed data transform apparatuses $20_1$-$20_N$.

Figure 2:
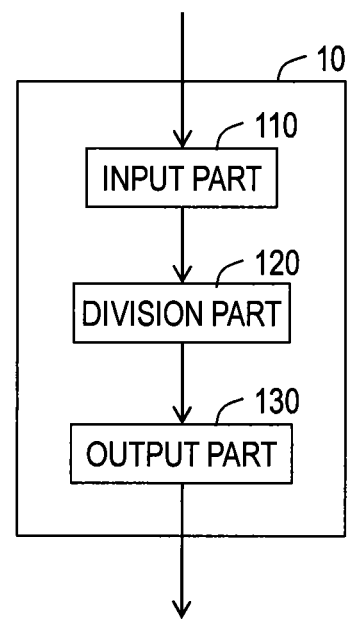
FIG. 2 is a diagram illustrating a functional configuration of a data distribution apparatus.

An exemplary configuration of the data distribution apparatus 10 included in the secret sharing system 1 will be described with reference to FIG. 2. The data distribution apparatus 10 includes an input part 110, a division part 120, and an output part 130.

Figure 3:
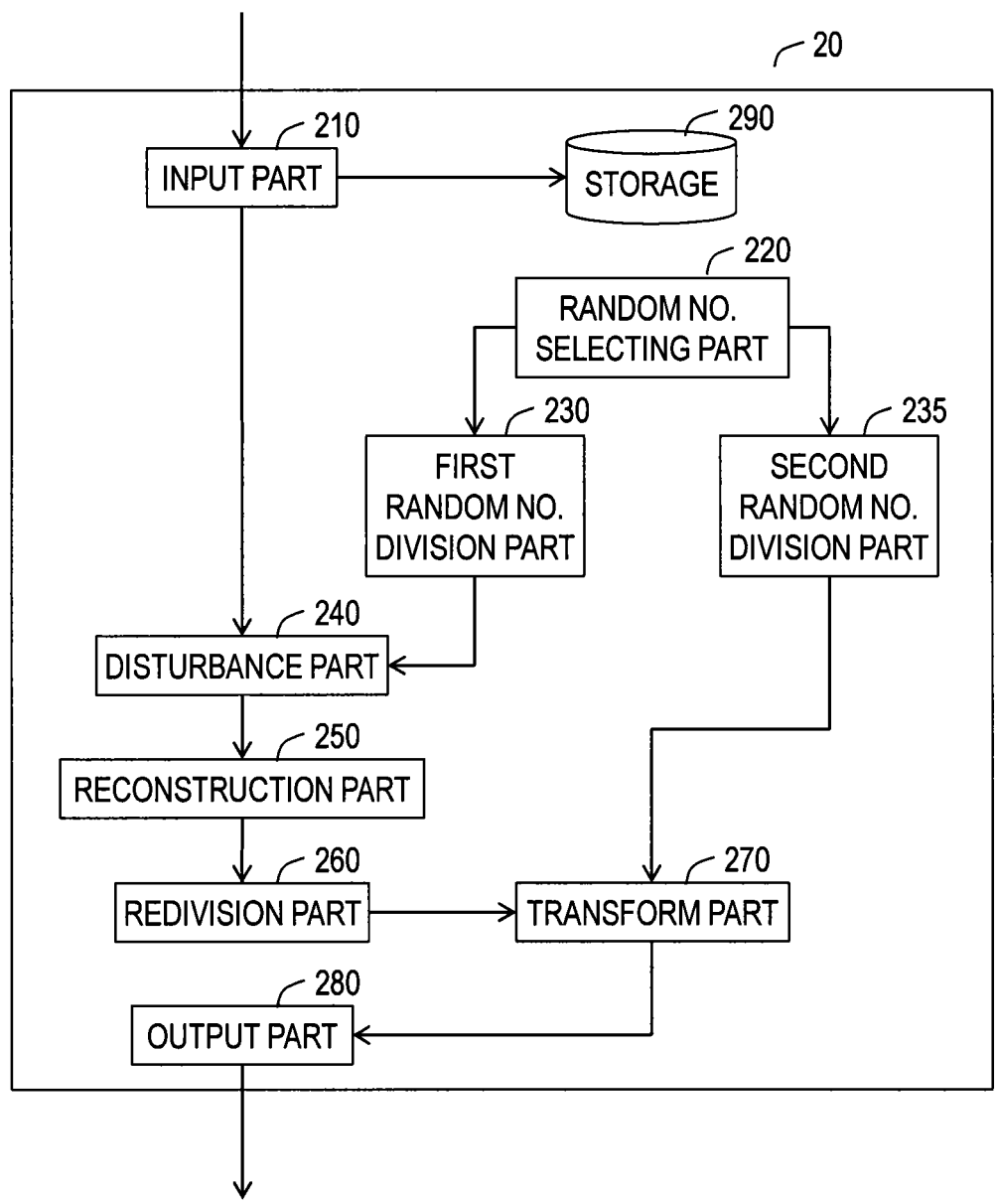
FIG. 3 is a diagram illustrating a functional configuration of a distributed data transform apparatus.

An exemplary configuration of a distributed data transform apparatus 20 included in the secret sharing system 1 will be described with reference to FIG. 3. The distributed data transform apparatus 20 includes an input part 210, a random number selecting part 220, a first random number division part 230, a second random number division part 235, a disturbance part 240, a reconstruction part 250, a redivision part 260, a transform part 270, an output part 280, and a storage 290. The storage 290 may be a main memory such as a RAM (Random Access Memory), an auxiliary storage device such as a hard disk, an optical disc, or a semiconductor memory device such as a flash memory, or middleware such as a relational database or a key value store.

<Data Distribution Process>

Figure 4:
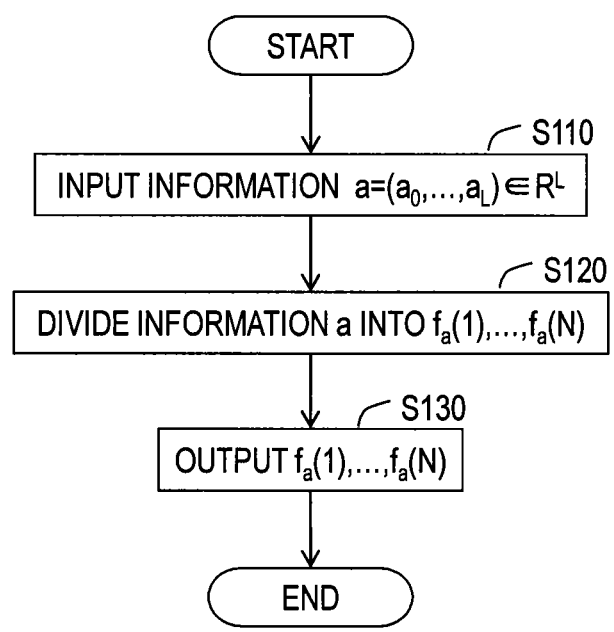
FIG. 4 is a diagram illustrating a process flow in the data distribution apparatus.

Referring to FIG. 4, an exemplary operation of the data distribution apparatus 10 will be described in order of procedure actually performed. In the following description, N, K and L are integers greater than or equal to 2, N≥K>L, n=1, ..., N, λ, represents K different integers, K is an integer greater than or equal to 1 and less than or equal to N, i is an integer, i∈λ, $f_x(n)$ represents N shares, and R is a ring.

At step S110, information a is input into the input part 110. The information a is an L-dimensional vector whose elements are L values $a_1, \ldots, a_L$ on a ring R. Accordingly, the information a can be written as $a=(a_1, \ldots, a_L) \in R^L$. Examples of the information a include a video file, an audio file, a text file, and a table file. The data amount of the information a may be greater than or equal to 1 megabytes, for example.

The information a is input into the division part 120. At step S120, the division part 120 divides the information a into N shares $f_a(1), \ldots, f_a(N)$ by using an arbitrary homomorphic ramp secret sharing scheme S1. Homomorphic means that $f_a(i)+f_b(i)=f_{a+b}(i)$ holds for shares $f_a(i), f_b(i)$ of two pieces of information a, b and for shares $f_{a+b}(i)$ of a+b. Ramp secret sharing schemes are a type of secret sharing in which original data can be reconstructed from K or more shares and no part of the original data can be reconstructed from K–L shares or less, where L is an integer less than K, but part of the original data can be obtained from K–L+1 or more and K–1 or less shares. The size of shares in ramp secret sharing schemes is 1/L of the size of the original data and therefore the ramp secret sharing schemes are efficient in encoding compared with schemes such as Shamir's secret sharing scheme in which the size of each share is about the same as the size of original data. Various ramp secret sharing schemes have been proposed. The ramp secret sharing scheme S1 used in the present invention needs to be a homomorphic ramp secret sharing scheme. Many homomorphic ramp secret sharing schemes have been proposed. For example, ramp secret sharing schemes such as a scheme described in Mikihiko Nishiara and Katsunori Takizawa, "Strong ramp threshold secret sharing scheme using polynomial interpolation", The Institute of Electronics, Information and Communication Engineers, research report, IT, Information Theory 109 (143), pp. 127-129, 2009-07-16.

At step S130, the output part 130 outputs shares $f_a(1), \ldots, f_a(N)$. The output shares $f_a(1), \ldots, f_a(N)$ are input into distributed data transform apparatuses $20_1$-$20_N$, respectively, through the network 90 or a portable recording medium such as a USB memory.

<Distributed Data Transform Process>

Figure 5:
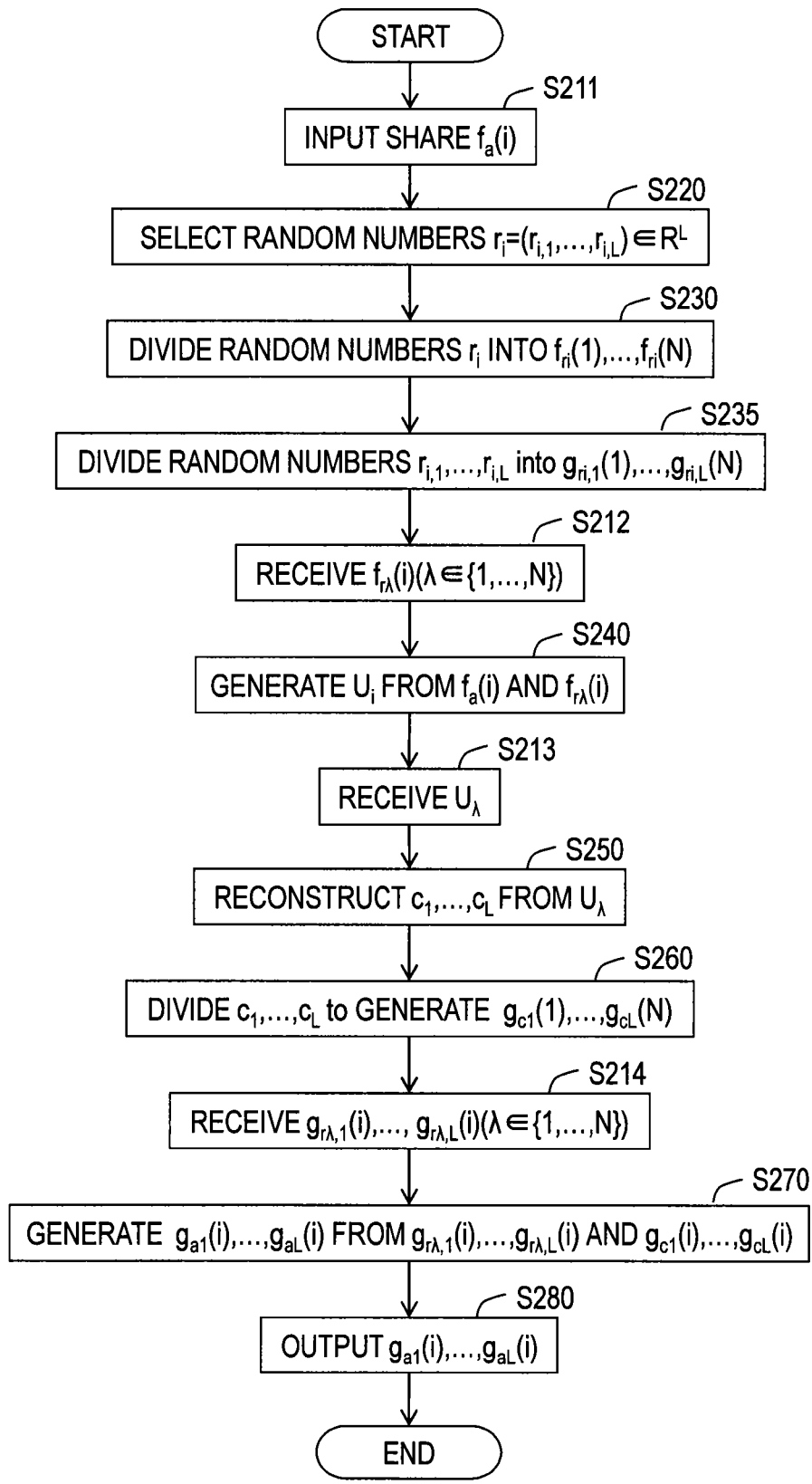
FIG. 5 is a diagram illustrating a process flow in the distributed data transform apparatus.

Referring to FIG. 5, an exemplary operation of distributed data transform apparatuses $20_i$ will be described in order of procedure actually performed.

At step S211, shares $f_a(i)$ output from the data distribution apparatus 10 are input into the input parts 210. The shares $f_a(i)$ may be stored in the storages 290 and the subsequent process may be performed at a given timing. Alternatively, the subsequent process may be executed immediately after the shares $f_a(i)$ are input without storing the shares $f_a(i)$ in the storages 290.

At step S220, the random number selecting part 220 selects L random numbers $r_{i1}, \ldots, r_{iL}$ from the ring R to generate a random number vector $r_i$. The random number vector $r_i$ is an L-dimensional vector whose elements are random numbers $r_{i,1}, \ldots, r_{i,L}$. Accordingly, the random number vector $r_i$ can be written as $r_i=(r_{i1}, \ldots, r_{iL}) \in R^L$. The random number selecting part 220 may randomly select L random numbers $r_{i1}, \ldots, r_{iL}$ one by one or may select L random numbers $r_{i1}, \ldots, r_{iL}$ according to a predetermined rule from among a plurality of values generated and stored beforehand in a memory.

The random number vector $r_i$ is input into the first random number division part 230. At step S230, the first random number division part 230 divides the random number vector $r_i$ into N shares $f_{r_i}(1), \ldots, f_{r_i}(N)$ by using an arbitrary homomorphic ramp secret sharing scheme S1. The ramp secret sharing scheme S1 may be any homomorphic ramp secret sharing scheme but needs to be the same scheme as the ramp secret sharing scheme S1 used by the division part 120 of the data distribution apparatus 10.

The random numbers $r_{i1}, \ldots, r_{iL}$ are input into the second random number division part 235. At step S235, the second random number division part 235 divides each of the random numbers $r_{i1}, \ldots, r_{iL}$ into N shares $g_{i,1}(n), \ldots, g_{i,L}(n)$ (n=1, . . . , N) by using an arbitrary homomorphic secret sharing scheme S2. The secret sharing scheme S2 may be any secret sharing scheme that is homomorphic. For example, an existing linear secret sharing scheme such as Shamir's secret sharing scheme can be used. More specifically, a K−1-th degree polynomial $f_{i,j}(x)$, where $r_{i,j}=f_{i,j}(0)$ (j=1, . . . , L) and x is a variable, can be used to calculate $g_{ri,j}(n)=f_{i,j}(n)$ to generate shares $g_{ri,1}(n), \ldots, g_{ri,L}(n)$.

At step S212, K shares $f_{r\lambda}(i)$ generated by the first random number division parts 230 of K distributed data transform apparatuses $20_\lambda$ ($\lambda \in \{1, \ldots, N\}$) are input into the input part 210. The shares $f_{r\lambda}(i)$ may be stored in the storages 290 and the subsequent process may be performed at a given timing. Alternatively, the subsequent process may be executed immediately after the shares $f_{r\lambda}(i)$ are input without storing the shares $f_{r\lambda}(i)$ in the storages 290.

A share $f_a(i)$ and the K shares $f_{r\lambda}(i)$ are input into the disturbance part 240. At step S240, the disturbance part 240 generates a share $U_i$ by using the share $f_a(i)$ and the K shares $f_{r\lambda}(i)$. More specifically, the disturbance part 240 adds the sum of the K shares $f_{r\lambda}$ to the share $f_a(i)$ to generate a share $U_i$ as written as the following equation.

$$U_i = f_a(i) + \Sigma_{k \in \lambda} f_{r_k}(i) \qquad \text{[Formula 3]}$$

The share $f_a(i)$ is a share generated by dividing information a by using the homomorphic secret sharing scheme S2 and the shares $f_{r\lambda}(i)$ are shares generated by dividing each of K random number vectors $r_\lambda$ ($\lambda \in \{1, \ldots, N\}$) by using the homomorphic secret sharing scheme S2. Because of the homomorphism, the share $U_i$ is equal to a share generated by dividing the sum of the information a and the K random number vectors $r_\lambda$ by using the secret sharing scheme S2. It is assumed in the following description that the sum of the information a and the K random number vectors $r_\lambda$ is a ciphertext c. Thus the ciphertext c can be written as following equation.

$$c = a + \Sigma_{k \in \lambda} r_k \qquad \text{[Formula 4]}$$

Note that the process from step S211 to step S240 in FIG. 5 does not need to be performed by all of the N distributed data transform apparatuses $20_1$-$20_N$; the process has to be performed by only at least K distributed data transform apparatuses $20_1$-$20_N$ selected arbitrarily.

At step S213, K shares $U_\lambda$ generated by the disturbance parts 240 of the K distributed data transform apparatuses $20_\lambda$ ($\lambda \in \{1, \ldots, N\}$) are input into the input parts 210. The shares $U_\lambda$ may be stored in the storages 290 and the subsequent process may be executed at any given timing. Alternatively, the subsequent process may be executed immediately after the shares $U_\lambda$ are input without storing the shares U) in the storages 290.

The K shares $U_\lambda$ are input into the reconstruction part 250. At step S250, the reconstruction part 250 reconstructs L pieces of disturbance information $c_1, \ldots, c_L$ from the K shares $U_\lambda$ by using a predetermined homomorphic ramp secret sharing scheme S1. The ramp secret sharing scheme S1 may be any homomorphic ramp secret sharing scheme that is homomorphic but needs to be the same scheme as the ramp secret sharing scheme S1 used by the division part 120 of the data distribution apparatus 10 and the first random number division parts 230 of the distributed data transform apparatuses 20.

The L pieces of disturbance information $c_1, \ldots, c_L$ are input into the redivision part 260. At step S260, the redivision part 260 divides each of the pieces of the disturbance information $c_1, \ldots, c_L$ into N by using a predetermined homomorphic secret sharing scheme S2 to generate shares $g_{c1}(n), \ldots, g_{cL}(n)$ ($n=1, \ldots, N$). The secret sharing scheme S2 may be any secret sharing scheme that is homomorphic but needs to be the same scheme as the secret sharing scheme S2 used by the second random number division part 235.

Note that the process from step S213 to step S260 in FIG. 5 does not need to be performed by all of the N distributed data transform apparatuses $20_1$ to $20_N$; the process needs to be performed by only at least one selected arbitrarily from the N distributed data transform apparatuses $20_1$-$20_N$.

At step S214, shares $g_{r\lambda,1}(i), \ldots, g_{r\lambda,L}(i)$ generated by the second random number division parts 235 of the K distributed data transform apparatuses $20_\lambda$ ($\lambda \in \{1, \ldots, N\}$) are input into the input part 210. The shares $g_{r\lambda,1}(i), \ldots, g_{r\lambda,L}(i)$ may be stored in the storage 290 and the subsequent process may be performed at a given timing. Alternatively, the subsequent process may be executed immediately after the shares $g_{r\lambda,1}(i), \ldots, g_{r\lambda,L}(i)$ are input without storing the shares $g_{r\lambda,1}(i), \ldots, g_{r\lambda,L}(i)$ in the storage 290.

The L shares $g_{c1}(i), \ldots, g_{cL}(i)$ included in the shares $g_{c1}(n), \ldots, g_{cL}(n)$ and L×K shares $g_{r\lambda,1}(i), \ldots, g_{r\lambda,L}(i)$ are input into the transform part 270. At step S270, the transform part 270 generates shares $g_{a1}(i), \ldots, g_{aL}(i)$ of the information a by using the L shares $g_{c1}(i), \ldots, g_{cL}(i)$ and the L×K shares $g_{r\lambda,1}(i), \ldots, g_{r\lambda,L}(i)$. More specifically, the transform part 270 subtracts the sum of the shares $g_{r\lambda,j}(i)$ from a share $g_{cj}(i)$ to generate a share $g_{aj}(i)$ for $j=1, \ldots, L$ as written as the following equation.

$$g_{aj}(i) = g_{cj}(i) - \Sigma_{k \in \lambda} g_{r_k j}(i) \quad \text{[Formula 5]}$$

The share $g_{cj}(i)$ is a share generated by dividing the ciphertext c using the homomorphic secret sharing scheme S2 and the shares $g_{r\lambda,j}(i)$ are shares generated by dividing each of K random numbers $r_{\lambda j}$ ($\lambda \in \{1, \ldots, N\}$) by using the homomorphic secret sharing scheme S2. Since the ciphertext c is the sum of the information a and the K random number vectors $r_\lambda = (r_{\lambda,1}, \ldots, r_{\lambda,L})$, the share $g_{aj}(i)$ is equal to a share generated by dividing the information a by using the secret sharing scheme S2 because of the homomorphism.

At step S280, each output part 280 outputs the shares $g_{a1}(i), \ldots, g_{aL}(i)$. The shares $g_{a1}(i), \ldots, g_{aL}(i)$ may be stored in the storage 290 and may be read and output from the storage 290 in response to an external request.

Note that the process from step S214 to step S280 in FIG. 5 is performed by all of the N distributed data transform apparatuses $20_1$-$20_N$.

<Confidentiality>

Information about the information a obtained by the distributed data transform apparatuses $20_1$-$20_N$ is shares generated by the homomorphic ramp secret sharing S1 and shares generated by the homomorphic secret sharing scheme S2 and the confidentiality provided by this embodiment is determined by the confidentiality provided by the homomorphic ramp secret sharing scheme S1 and the homomorphic secret sharing scheme S2 used, on condition that the random numbers used for generating the shares are independent of each other. Furthermore, at least one distributed data transform apparatuses 20 obtains the ciphertext c, but cannot obtain the information a unless all of the random numbers are available, because the ciphertext c is the information a plus the sum of random numbers generated by other distributed data transform apparatuses 20. Therefore confidentiality provided by this embodiment is ultimately determined by the confidentiality provided by the secret sharing scheme S2 used.

<Advantageous Effects>

The secret sharing system according to this embodiment is capable of transforming shares $f_a(1), \ldots, f_a(N)$ of information $a=(a_1, \ldots, a_L)$ according to an arbitrary homomorphic ramp secret sharing scheme S1 to shares $g_a(1), \ldots, g_a(N)$ according to an arbitrary homomorphic secret sharing scheme S2.

Examples of homomorphic secret sharing schemes include existing linear secret sharing schemes such as Shamir's secret sharing scheme. Since methods for performing multiparty computation using existing linear secret sharing schemes such as Shamir's secret sharing scheme are known, multiparty computation can be performed using shares according to a ramp secret sharing scheme by choosing an existing linear secret sharing scheme, such as Shamir's secret sharing scheme, as the secret sharing scheme S2.

In the ramp secret sharing schemes, the lower limit of the size of each share is 1/L of original data. Accordingly, using a ramp secret sharing scheme can reduce the storage capacity required for storing shares as compared with Shamir's secret sharing scheme, in which the size of each share is substantially equal to the size of original data.

[Program and Recording Medium]

The present invention is not limited to the embodiments described above; various modifications can be made as appropriate without departing from the spirit of the present invention. The processes described in the embodiments may be performed not only in time sequence as is written or may be performed in parallel with one another or individually, depending on the throughput of the apparatuses that perform the processes or requirements.

If processing functions of any of the apparatuses described in the embodiments are implemented by a computer, the processing of the functions that the apparatuses should include is described in a program. The program is executed on the computer to implement the processing functions of the apparatus on the computer.

The programs describing the processing can be recorded on a computer-readable recording medium. The computer-readable recording medium may be any recording medium such as a magnetic recording device, an optical disc, a magneto-optical recording medium, and a semiconductor memory.

The program is distributed by selling, transferring, or lending a portable recording medium on which the program is recorded, such as a DVD or a CD-ROM. The program may be stored on a storage device of a server computer and transferred from the server computer to other computers over a network, thereby distributing the program.

A computer that executes the program first stores the program recorded on a portable recording medium or transferred from a server computer into a storage device of the computer. When the computer executes the processes, the computer reads the program stored on the recording medium of the computer and executes the processes according to the read program. In another mode of execution of the program, the computer may read the program directly from a portable recording medium and execute the processes according to the program or may execute the processes according to the program each time the program is transferred from the server computer to the computer. Alternatively, the processes may be executed using a so-called ASP (Application Service Provider) service in which the program is not transferred from a server computer to the computer but process functions are implemented by instructions to execute the program and acquisition of the results of the execution. Note that the program in this mode encompasses information that is provided for processing by an electronic computer and is equivalent to the program (such as data that is not direct commands to a computer but has the nature that defines processing of the computer).

While the apparatuses are configured by causing a computer to execute a predetermined program in the embodiments described above, at least some of the processes may be implemented by hardware.

What is claimed is:

1. A secret sharing system comprising a data distribution apparatus and N distributed data transform apparatuses,
   the data distribution apparatus comprising:
   circuitry configured to:
       receive an electronic information file $a=(a_1, \ldots, a_L) \in R^L$ as an input;
       divide the electronic information file a into N shares $f_a(n)$ by using an arbitrary homomorphic ramp secret sharing scheme S1;
   each of the distributed data transform apparatuses comprising:
   another circuitry configured to:
       generate a random number vector $r_i = (r_{i,1}, \ldots, r_{i,L})$ whose elements are L random numbers $r_{i,1}, \ldots, r_{i,L} \in R$;
       divide the random number vector $r_i$ into N shares $f_n(n)$ by using the ramp secret sharing scheme S1;
       divide each of the random numbers $r_{i,1}, \ldots, r_{i,L}$ into N shares $g_{ri,1}(n), \ldots, g_{ri,L}(n)$ by using an arbitrary homomorphic secret sharing scheme S2;
       generate a share $U_i$ by using a share $f_a(i)$ included in the shares $f_a(n)$ and K shares $f_{r\lambda}(i)$;
       reconstruct L pieces of disturbance information $c_1, \ldots, c_L$ from K shares $U^\lambda$ by using the ramp secret sharing scheme S1;
       divide each of the pieces of disturbance information $c_1, \ldots, c_L$ into N by using the secret sharing scheme S2 to generate shares $g_{c1}(n), \ldots, g_{cL}(n)$; and
       generate shares $g_{a1}(i), \ldots, g_{aL}(i)$ of the electronic information file a by using L shares $g_{c1}(i), \ldots, g_{cL}(i)$ included in the shares $g_{c1}(n), \ldots, g_{cL}(n)$, and L×K shares $g_{r\lambda,1}(i), \ldots, g_{r\lambda,L}(i)$,
       wherein N, K, and L are integers greater than or equal to 2, N≥K>L, n=1, ..., N, λ represents K different integers greater than or equal to 1 and less than or equal to N, i is an integer, i∈λ, $f_x(n)$ represents N shares of an electronic information file x, and R is a ring, and
       wherein at least K distributed data transform apparatuses are configured to reproduce the electronic information file a when at least K reconstructed values $U_i$ are reconstructed separately respectively by the at least K distributed data transform apparatuses, and none of the electronic information file a can be obtained when less than the K reconstructed values $U_i$ are reconstructed by less than the K distributed data transform apparatuses.

2. The secret sharing system according to claim 1, wherein the another circuitry is configured to:
   add a sum of the shares $f_{r\lambda}(i)$ to the share $f_a(i)$ to generate the share $U_i$, and
   subtract a sum of the shares $g_{r\lambda,j}(i)$ from the share $g_{cj}(i)$ to generate the share $g_{aj}(i)$ for j=1, ..., L.

3. The secret sharing system according to claim 1, wherein the secret sharing scheme S2 is Shamir's secret sharing scheme.

4. A distributed data transform apparatus, in a secret sharing system comprising a data distribution apparatus and N distributed data transform apparatuses, wherein the data distribution apparatus receives an electronic information file $a=(a_1, \ldots, a_L) \in R^L$ as an input and divides the electronic information file a into N shares $f_a(n)$ by using an arbitrary homomorphic ramp secret sharing scheme S1, the distributed data transform apparatus comprising:
   circuitry configured to:
       generate a random number vector $r_i = (r_{i,1}, \ldots, r_{i,L})$ whose elements are L random numbers $r_{i,1}, \ldots, r_{i,L} \in R$;
       divide the random number vector $r_i$ into N shares $f_n(n)$ by using the ramp secret sharing scheme S1;
       divide each of the random numbers $r_{i,1}, \ldots, r_{i,L}$ into N shares $g_{ri,1}(n), \ldots, g_{ri,L}(n)$ by using an arbitrary homomorphic secret sharing scheme S2;
       generate a share $U_i$ by using a share $f_a(i)$ included in the N shares $f_a(n)$ into which the electronic information file a is divided by using the ramp secret sharing scheme S1 and K shares $f_{r\lambda}(i)$;
       reconstruct L pieces of disturbance information $c_1, \ldots, c_L$ from K shares $U_\lambda$ by using the ramp secret sharing scheme S1;
       divide each of the pieces of disturbance information $c_1, \ldots, c_L$ into N by using the secret sharing scheme S2 to generate shares $g_{c1}(n), \ldots, g_{cL}(n)$; and
       generate shares $g_{a1}(i), \ldots, g_{aL}(i)$ of the electronic information file a by using L shares $g_{c1}(i), \ldots, g_{cL}(i)$ included in the shares $g_{c1}(n), \ldots, g_{cL}(n)$, and L×K shares $g_{r\lambda,1}(i), \ldots, g_{r\lambda,L}(i)$,
       wherein N, K, and L are integers greater than or equal to 2, N≥K>L, n=1, ..., N, λ represents K different integers greater than or equal to 1 and less than or equal to N, i is an integer, i∈λ, $f_x(n)$, represents N shares of an electronic information file x, and R is a ring, and
       wherein at least K distributed data transform apparatuses are configured to reproduce the electronic information file a when at least K reconstructed values $U_i$ are reconstructed separately respectively by the at least K distributed data transform apparatuses, and none of the electronic information file a can be obtained when less than the K reconstructed values $U_i$ are reconstructed by less than the K distributed data transform apparatuses.

5. A secret sharing method, implemented by a secret sharing system comprising a data distribution apparatus and N distributed data transform apparatuses, comprising:
   receiving, by circuitry of the data distribution apparatus, an electronic information file $a=(a_1, \ldots, a_L) \in R^L$ as an input;
   dividing, by the circuitry of the data distribution apparatus, the electronic information file a into N shares $f_a(n)$ by using an arbitrary homomorphic ramp secret sharing scheme S1;
   generating, by another circuitry of each of the distributed data transform apparatuses, a random number vector $r_i = (r_{i,1}, \ldots, r_{i,L})$ whose elements are L random numbers $r_{i,1}, \ldots, r_{i,L} \in R$;
   dividing, by the another circuitry of each of the distributed data transform apparatuses, the random number vector $r_i$ into N shares $f_n(n)$ using the ramp secret sharing scheme S1;

dividing, by the another circuitry of each of the distributed data transform apparatuses, each of the random numbers $r_{i,1}, \ldots, r_{i,L}$ into N shares $g_{ri,1}(n), \ldots, g_{ri,L}(n)$ by using an arbitrary homomorphic secret sharing scheme S2;

generating, by the another circuitry of each of the distributed data transform apparatuses, a share $U_i$ by using a share $f_a(i)$ included in the shares $f_a(n)$ and K shares $f_{r\lambda}(i)$, reconstructing, by the another circuitry of each of the distributed data transform apparatuses, L pieces of disturbance information $c_1, \ldots, c_L$ from K shares $U_\lambda$ by using the ramp secret sharing scheme S1;

dividing, by the another circuitry of each of the distributed data transform apparatuses, each of the pieces of disturbance information $c_1, \ldots, c_L$ into N by using the secret sharing scheme S2 to generate shares $g_{c1}(n), \ldots, g_{cL}(n)$; and generating, by the another circuitry of each of the distributed data transform apparatuses, shares $g_{a1}(i), \ldots, g_{aL}(i)$ of the electronic information file a by using L shares $g_{c1}(i), \ldots, g_{cL}(i)$ included in the shares $g_{c1}(n), \ldots, g_{cL}(n)$, and L×K shares $g_{r\lambda,1}(i), \ldots, g_{r\lambda,L}(i)$, wherein N, K, and L are integers greater than or equal to 2, N≥K>L, n=1, ..., N, λ represents K different integers greater than or equal to 1 and less than or equal to N, i is an integer, i∈λ, $f_x(n)$ represents N shares of an electronic information file x, and R is a ring, and wherein at least K distributed data transform apparatuses are configured to reproduce the electronic information file a when at least K reconstructed values $U_i$ are reconstructed separately respectively by the at least K distributed data transform apparatuses, and none of the electronic information file a can be obtained when less than the K reconstructed values $U_i$ are reconstructed by less than the K distributed data transform apparatuses.

6. A non-transitory computer readable medium including computer executable instructions that make a distributed data transform apparatus, in a secret sharing system comprising a data distribution apparatus and N distributed data transform apparatuses, wherein the data distribution apparatus receives an electronic information file $a = (a_1, \ldots, a_L) \in R^L$ as an input and divides the electronic information file a into N shares $f_a(n)$ by using an arbitrary homomorphic ramp secret sharing scheme S1, perform a method comprising:

generating a random number vector $r_i = (r_{i,1}, \ldots, r_{i,L})$ whose elements are L random numbers $r_{i,1}, \ldots, r_{i,L} \in R$;

dividing the random number vector $r_i$ into N shares $f_{ri}(n)$ by using the ramp secret sharing scheme S1;

dividing each of the random numbers $r_{i,1}, \ldots, r_{i,L}$ into N shares $g_{ri,1}(n), \ldots, g_{ri,L}(n)$ by using an arbitrary homomorphic secret sharing scheme S2;

generating a share $U_i$ by using a share $f_a(i)$ included in the N shares $f_a(n)$ into which the electronic information file a is divided by using the ramp secret sharing scheme S1 and K shares $f_{r\lambda}(i)$;

reconstructing L pieces of disturbance information $c_1, \ldots, c_L$ from K shares $U_\lambda$ by using the ramp secret sharing scheme S1;

dividing each of the pieces of disturbance information $c_1, \ldots, c_L$ into N by using the secret sharing scheme S2 to generate shares $g_{c1}(n), \ldots, g_{cL}(n)$; and generating shares $g_{a1}(i), \ldots, g_{aL}(i)$ of the electronic information file a by using L shares $g_{c1}, \ldots, g_{cL}(i)$ included in the shares $g_{c1}(n), \ldots, g_{cL}(n)$, and L×K shares $g_{r\lambda,1}(i), \ldots, g_{r\lambda,L}(i)$, wherein N, K, and L are integers greater than or equal to 2, N≥K>L, n=1, ..., N, λ represents K different integers greater than or equal to 1 and less than or equal to N, i is an integer, i∈λ, $f_x(n)$ represents N shares of an electronic information file x, and R is a ring, and wherein at least K distributed data transform apparatuses are configured to reproduce the electronic information file a when at least K reconstructed values $U_i$ are reconstructed separately respectively by the at least K distributed data transform apparatuses, and none of the electronic information file a can be obtained when less than the K reconstructed values $U_i$ are reconstructed by less than the K distributed data transform apparatuses.

* * * * *